Dec. 9, 1958

T. T. N. BUCHER 2,864,059

FREQUENCY CONTROL CIRCUIT

Filed Aug. 17, 1955

INVENTOR.
THOMAS T. N. BUCHER
BY
*G. A. Rechif*
ATTORNEY 2,864,059
Patented Dec. 9, 1958

United States Patent Office

2,864,059

FREQUENCY CONTROL CIRCUIT

Thomas T. N. Bucher, Moorestown, N. J., assignor to Radio Corporation of America, a corporation of Delaware Application August 17, 1955, Serial No. 529,006

3 Claims. (Cl. 332—29)

This invention relates to a frequency control circuit for an oscillator, and more particularly to a circuit which can be used for automatic frequency control (AFC) and/or frequency modulation (FM) of an oscillator.

This invention is particularly useful in battery-operated portable FM transceivers and it will be described in connection therewith, although it is pointed out that it is also useful in other types of FM equipment where it is impractical or impossible to provide regulation of the supply voltages to the modulator or control circuit.

In prior frequency modulators wherein a saturable reactor was employed to cause a variation in the resonant frequency of an oscillator circuit by virtue of a change of current through the control winding of the reactor, the reactor control winding was commonly connected between the anode of a vacuum tube and a source of positive anode voltage. The current passing through the control winding, by controlling the degree of saturation of the core on which the control winding is mounted, controls the inductance of the controlled winding mounted on this same core. Consequently, the frequency of the oscillating circuit, of which the controlled winding is a part, is also varied. In a system connected as described, when the value of the positive anode voltage and the bias voltage applied to the grid change (as by changing load on the source, aging of a battery source, etc.), the current through the winding changes (in dependence on the characteristics of the tube). Consequently, the degree of saturation of the core changes, modifying the frequency of the oscillating circuit. If the oscillating circuit is provided with AFC (either through the reactor or by other means), an appreciable fraction of the AFC correction range may be required to compensate for this change. Moreover, if the change occurs at audio frequencies, it may result in undesirable modulation of the oscillator.

An object of this invention is to provide a reactance frequency modulator and AFC circuit which is substantially independent of, or insensitive to, variations in supply voltages.

Another object is to accomplish the foregoing object in a simple and inexpensive manner.

The objects of this invention are accomplished, briefly, in the following manner: The control winding of the saturable reactor is connected in a four-arm resistance bridge one arm of which is constituted by the anode-to-cathode resistance of a vacuum tube the grid of which is supplied with a modulating and/or control signal. The control winding is connected across one pair of diagonally-opposite terminals of the bridge, and the anode voltage source is connected across the other pair of diagonally-opposite bridge terminals.

The objects of this invention will be better understood from the following description of an exemplification thereof, reference being had to the accompanying drawing, wherein.

Figure 1:
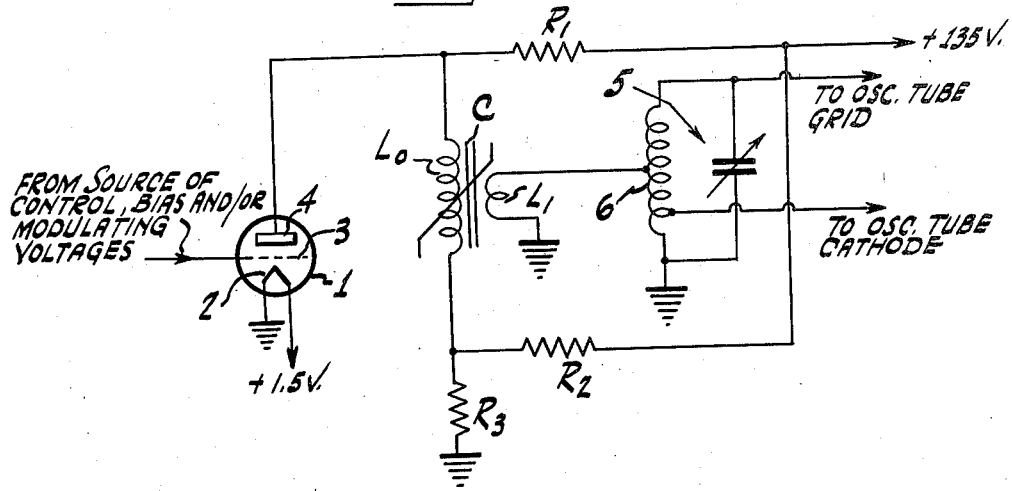
Fig. 1 is a circuit diagram of an arrangement according to this invention.

A triode vacuum tube 1 has an electron-emissive filament 2, a grid 3 and an anode or plate 4. The anode (plate) resistance of tube 1 forms one of the resistances of a four-arm bridge network, or the anode-cathode path of this tube forms one of the impedance arms of a four-arm bridge. The remaining three impedance arms of the bridge are constituted by resistors $R_1$, $R_2$ and $R_3$. Anode 4 is connected by way of resistor $R_1$ to the positive terminal +135 v. of an anode voltage source the negative terminal of which is connected to ground. The filament 2 is also connected to ground. Resistors $R_2$ and $R_3$ are connected in series in that order between the positive terminal +135 v. and ground. Thus, it may be seen that the power source, or source of anode voltage, is connected across one pair of diagonally-opposite terminals of the bridge, since this source is connected between the common junction of resistors $R_1$ and $R_2$ and the common junction (ground) of resistor $R_3$ and the cathode 2.

The control winding $L_0$ of a saturable reactor is connected between the junction of resistor $R_1$ and anode 4 and the junction of resistors $R_2$ and $R_3$. Thus, it may be seen that this control winding is connected across the second pair of diagonally-opposite terminals of the four-arm resistance or impedance bridge described.

In addition to the control winding $L_0$, the saturable reactor comprises a controlled winding $L_1$ and a core C, both windings $L_0$ and $L_1$ being mounted on the core C, which is adapted to tend to become saturated as the current in the control winding $L_0$ increases. The controlled winding $L_1$ is made a part of an oscillatory tank or resonant circuit 5 by grounding one end of coil $L_1$ and connecting the other end of coil $L_1$ to an intermediate point on the inductance 6 of tank circuit 5. The upper end of tank circuit 5 is connected to the grid of an oscillator tube (not shown), an intermediate point on the inductance 6 is connected to the cathode of the oscillator tube, while the lower end of the tank circuit is grounded and thereby connected for oscillatory currents to the anode of the oscillator tube. Thus, the controlled winding $L_1$ is made a part of the oscillatory circuit 5. The oscillator circuit itself may for example be of the type illustrated in more detail in the copending Whitman application, Serial No. 523,015, filed July 19, 1955.

As the current in control winding $L_0$ increases, the core C tends to become saturated, thereby reducing the inductance of the controlled winding $L_1$ and modifying the frequency of the oscillatory circuit 5, of which the inductance of winding $L_1$ forms a part. As the current in control winding $L_0$ decreases, the inductance of winding $L_1$ increases, modifying the frequency of the oscillatory circuit 5 in the opposite direction. It will now be explained how changes in the current flowing through the winding $L_0$ are caused to occur.

The grid 3 may be supplied with a modulating voltage, in order to effect FM of the oscillator, and it may also be supplied with an AFC voltage, to effect frequency control or frequency correction of the oscillator. The modulating voltage may be derived from any suitable source, such as a microphone, while the control voltage may be obtained from a discriminator, both of these features being more fully illustrated in the said copending application. The resistance between the anode 4 and cathode 2 of tube 1 is varied by the control and modulating voltages applied to the grid 3 of this tube. This varies the balance in the impedance bridge, varying the current through control winding $L_0$ and effecting FM or frequency correction in the oscillatory circuit 5.

A biasing voltage is also applied to the grid 3 to establish the nominal operating point of tube 1. This biasing voltage, like the anode voltage for the tube, may be obtained from a battery source, and both of these voltages may therefore vary widely. In this invention, the current through the control winding $L_0$ of the reactor is maintained substantially constant for normal variations of anode supply voltage and bias voltage, when such voltages are unregulated.

Figure 2:
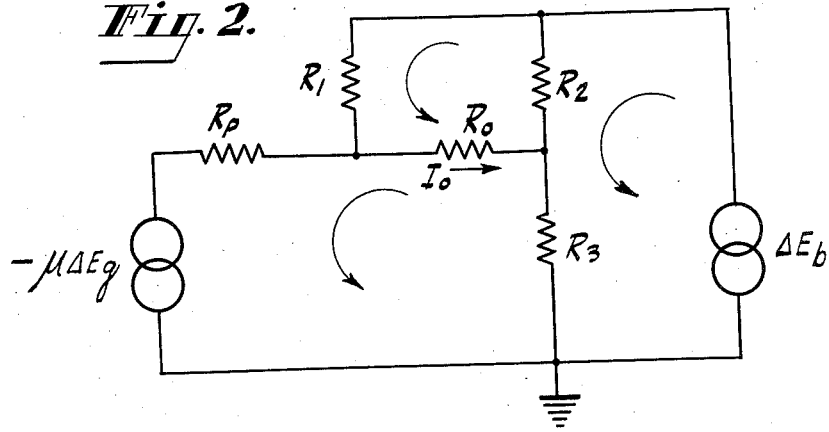
Fig. 2 is a diagram of the equivalent circuit of Fig. 1.

Fig. 2 is a diagram of the equivalent circuit of Fig. 1, and in Fig. 2 the voltages $-\mu \Delta E_g$ and $\Delta E_b$ represent variations in battery supply voltages, $R_0$ represents the resistance of the modulation reactor $L_0$, $R_p$ is the anode (plate) resistance of the tube 1 at the nominal operating point, and $\mu$ is the tube amplification factor.

When the resistance $R_0$ is small compared to the other elements, it may be neglected. For changes small enough so that the tube characteristics may be considered linear, the change in current $\Delta I_0$ through the reactor for a change in supply voltages (anode voltage and grid bias) is $$\Delta I_0 = \frac{\Delta E_b(R_2 R_p - R_1 R_3) - \mu \Delta E_g R_1(R_2 + R_3)}{R_p(R_1 R_2 + R_1 R_3 + R_2 R_3) + R_1 R_2 R_3} \quad (1)$$

where $\Delta E_b$ and $\Delta E_g$ are the changes in anode voltage and grid voltage, respectively.

From Equation 1, it may be seen that when $$\Delta E_b(R_2 R_p - R_1 R_3) = \mu \Delta E_g R_1(R_2 + R_3) \quad (2)$$

or when (to express it another way)

$$\Delta E_g = \left(\frac{\Delta E_b}{\mu}\right) \frac{R_2 R_p - R_1 R_3}{R_1(R_2 + R_3)} \quad (3)$$

then $\Delta I_0 = 0$. This is an important result, since it states that for predetermined changes in the supply voltages the resistors may be designed or varied so that the current in the reactor control winding $L_0$ does not change. The actual values of $R_1$, $R_2$ and $R_3$ must be determined to provide the proper current in the reactor control winding, and to provide a compromise among control sensitivity, effective compensation, and current drawn by the complete circuit from the source.

For example, in a particular case, tube 1 was a type 5676 tube, $R_1$ and $R_2$ were 12,000 ohms each and $R_3$ was 11,300 ohms. With these values, a change in anode voltage from 130 to 100 volts and a simultaneous change in the bias voltage from $-2.0$ to $-1.5$ volts, left the current $I_0$ in the reactor unchanged at 1.24 milliamperes.

In a particular case, the voltages may change in relatively different proportions, but readjustment of the resistors will still permit the compensation to be maintained. In practice, perfect compensation can be achieved in the vicinity of the nominal operating point, but because of the curved nature of the true tube characteristics, compensation might not be maintained over the full range of operation, especially when the circuit is employed for AFC purposes. However, the degree of improvement which is realizable by this invention, for applications where voltages cannot be regulated (such as in small portable or hand-held battery-operated transceivers, for example), can be sufficient to mean the difference between operation and non-operation of the radio set when the same is subjected to appreciable voltage changes.

The oscillator itself may vary its frequency with variations in the same voltages as are applied to the reactance modulator, even when the inductance provided by $L_1$ is constant. In such a case, the resistors of the bridge may be so proportioned as to compensate for the oscillator variations, by causing a change in $I_0$ which will shift the frequency oppositely to the voltage-produced variation of the oscillator frequency itself.

Resistor $R_1$ can be omitted, in which case $$\Delta I_0 = \frac{-\Delta E_b R_3 - \mu \Delta E_g(R_2 + R_3)}{R_p(R_2 + R_3) + R_2 R_3} \quad (4)$$

In this case, compensation again will be available in many situations, but a somewhat narrower range of design choice is available, because of the lack of the extra design parameter. For example, compensation for the voltage variations stated previously (anode voltage change from 130 to 100 volts and bias voltage change from $-2.0$ to $-1.5$ v.) would require, in this case, that $R_2 = 3R_3$. The actual values of $R_2$ and $R_3$ also have to be chosen to provide the proper initial current through coil $L_0$.

The saturable reactor may be considered to be a current-actuated controlling device, since the current through its control winding $L_0$ governs the inductance of its controlled winding $L_1$. The anode-cathode path of tube 1 is a variable resistor whose resistance value varies in response to the voltage applied across it (the anode voltage) and also in response to another voltage (e. g., its grid bias voltage). In other words, the controlling device (saturable reactor) is actuated in response to changes in an electrical variable (the current therethrough), while the variable electric circuit element 1 has characteristics which vary in response to two electrical variables (its anode voltage and its grid bias voltage).

What is claimed is:

1. A frequency control circuit comprising a saturable reactor with a control winding and a controlled winding, a four-arm impedance bridge having four terminals, the impedance of one of said arms being variable in response to a signal, means coupling said control winding across one pair of diagonally-opposite terminals of said bridge, means coupling a source of power across the other pair of diagonally-opposite terminals of said bridge, and terminals connected to said controlled winding for coupling the same to an oscillatory circuit whose resonant frequency is to be controlled.

2. A frequency control circuit comprising a saturable reactor with a control winding and a controlled winding, a four-arm impedance bridge having four terminals, the impedance of one of said arms being constituted by an electron flow control device whose impedance is variable in response to a signal, means coupling said control winding across one pair of diagonally-opposite terminals of said bridge, means coupling a source of power across the other pair of diagonally-opposite terminals of said bridge, and terminals connected to said controlled winding for coupling the same to an oscillatory circuit whose resonant frequency is to be controlled.

3. A frequency control circuit comprising a saturable reactor with a control winding and a controlled winding, a four-arm impedance bridge having four terminals, the impedance of one of said arms being constituted by an electron flow control device whose impedance is variable in response to a signal, means coupling said control winding across one pair of diagonally-opposite terminals of said bridge, means coupling a source of power across the other pair of diagonally-opposite terminals of said bridge, and terminals connected to said controlled winding for coupling the same to a circuit which is to be controlled.

References Cited in the file of this patent

UNITED STATES PATENTS

| | | |
|---|---|---|
| 1,667,792 | Martin | May 1, 1928 |
| 2,076,264 | Chireix et al. | Apr. 6, 1937 |
| 2,373,208 | Trucksess | Apr. 10, 1945 |
| 2,439,313 | Meagher | Apr. 6, 1948 |
| 2,541,650 | Hepp | Feb. 13, 1951 |